(12) United States Patent
Gallo et al.

(10) Patent No.: US 10,001,900 B2
(45) Date of Patent: *Jun. 19, 2018

(54) SCREEN READER WITH CUSTOMIZABLE WEB PAGE OUTPUT

(71) Applicant: Freedom Scientific, Inc., St. Petersburg, FL (US)

(72) Inventors: Robert Gallo, Tucker, GA (US); Glen Gordon, Madison, WI (US)

(73) Assignee: Freedom Scientific, Inc., St. Petersburg, FL (US)

( * ) Notice: Subject to any disclaimer, the term of this patent is extended or adjusted under 35 U.S.C. 154(b) by 924 days.

This patent is subject to a terminal disclaimer.

(21) Appl. No.: 14/481,180

(22) Filed: Sep. 9, 2014

(65) Prior Publication Data

US 2014/0380149 A1 Dec. 25, 2014

Related U.S. Application Data

(63) Continuation of application No. 13/491,799, filed on Jun. 8, 2012, now Pat. No. 8,862,985.

(51) Int. Cl.
*G06F 17/24* (2006.01)
*G06F 3/0481* (2013.01)
*G06F 3/01* (2006.01)
*G09B 21/00* (2006.01)
*G06F 3/16* (2006.01)
*G06F 17/22* (2006.01)

(52) U.S. Cl.
CPC ............ *G06F 3/0481* (2013.01); *G06F 3/011* (2013.01); *G06F 3/16* (2013.01); *G06F 17/2247* (2013.01); *G09B 21/003* (2013.01); *G09B 21/005* (2013.01); *G09B 21/006* (2013.01); *G09B 21/008* (2013.01); *G06F 2203/04805* (2013.01)

(58) Field of Classification Search
None
See application file for complete search history.

(56) References Cited

U.S. PATENT DOCUMENTS

| | | | | |
|---|---|---|---|---|
| 5,899,975 | A * | 5/1999 | Nielsen | G06F 17/218 704/270.1 |
| 6,725,424 | B1 * | 4/2004 | Schwerdtfeger | G06F 17/30905 704/271 |
| 6,993,707 | B2 * | 1/2006 | Baker | G06F 17/30884 707/E17.114 |
| 6,996,768 | B1 * | 2/2006 | Elo | G06F 17/227 715/206 |
| 7,085,994 | B2 * | 8/2006 | Gvily | G06F 17/3089 707/E17.116 |

(Continued)

*Primary Examiner* — Wilson W Tsui
(74) *Attorney, Agent, or Firm* — Andriy Lytvyn; Anton J. Hopen; Smith & Hopen, P.A.

(57) ABSTRACT

A screen reader application for visually impaired users suppresses unwanted content that is output by Braille or text-to-speech. The invention accesses, but does not modify, the document object model of the web page and enumerates web page elements for the end user to either hide or skip to. The end user selections are saved as rules which may be applied according to various levels of scope include web page specific, site specific or web-wide. A screen magnification application for visually impaired users automatically sets the visual focus and magnification level on a web page element according to end-user selection.

20 Claims, 13 Drawing Sheets

(56) References Cited

U.S. PATENT DOCUMENTS

| | | | |
|---|---|---|---|
| 7,194,411 B2* | 3/2007 | Slotznick | G09B 5/06 704/1 |
| 7,720,868 B2* | 5/2010 | Mauceri, Jr. | G06F 17/2229 707/796 |
| 7,877,260 B2* | 1/2011 | Takagi | G06F 17/2247 704/270.1 |
| 8,806,469 B2* | 8/2014 | Jones | G06F 8/67 717/168 |
| 2002/0156807 A1* | 10/2002 | Dieberger | G06F 3/016 715/247 |
| 2003/0229850 A1* | 12/2003 | Lue | G06F 17/30905 715/255 |
| 2005/0034063 A1* | 2/2005 | Baker | G06F 17/30884 715/241 |
| 2005/0160065 A1* | 7/2005 | Seeman | G06F 17/30867 |
| 2006/0150110 A1* | 7/2006 | Dietl | G06F 17/30899 715/760 |
| 2009/0070413 A1* | 3/2009 | Priyadarshan | G06F 17/2247 709/203 |

* cited by examiner

Fig. 7

| Non-Visual Output without Rule | Non-Visual Output with Rule Applied |
|---|---|
| Graphic: Today's News is the newest news you can get from any news website. Today is May 22, 2012. Movie Star Helps Charity Raise Money. An actress that has appeared in many movies took time out to raise money for a charity that helps people needing assistance. The actress was quoted as saying "it nice to help people." Online Dating for People. Are you a person that would like to meet another person? Why not try online dating at this sponsored link? The charity reported it was grateful for the help of the actress. The charity further indicated that more money had been raised this year than had been raised last year. The director of the charity noted "raising money is helpful." | Movie Star Helps Charity Raise Money. An actress that has appeared in many movies took time out to raise money for a charity that helps people needing assistance. The actress was quoted as saying "it nice to help people." Online Dating for People. Are you a person that would like to meet another person? Why not try online dating at this sponsored link? The charity reported it was grateful for the help of the actress. The charity further indicated that more money had been raised this year than had been raised last year. The director of the charity noted "raising money is helpful." |

SCREEN READER WITH CUSTOMIZABLE WEB PAGE OUTPUT

CROSS REFERENCE TO RELATED APPLICATIONS

This application is a continuation of U.S. Nonprovisional patent application Ser. No. 13/491,799 filed Jun. 8, 2012, entitled "Screen reader with customizable web page output."

BACKGROUND OF THE INVENTION

1. Field of the Invention

This invention relates to screen reader software for blind and low-vision computer users. More specifically, it relates to enhancements to reduce undesired speech and/or Braille output from web pages.

2. Brief Description of the State of the Art

Personal computers and the Internet greatly enhanced communications and access to information from around the world. Typically, visual information is displayed upon a monitor screen and data can be added or manipulated via keystrokes upon an associated keyboard. Feedback is provided visually to the user by the monitor screen. Blind users cannot utilize the information appearing upon the monitor screen while visually impaired users may experience difficulty doing so. Accordingly, screen readers have been developed to assist blind and visually impaired users when they use a personal computer.

A screen reader is software which interprets the output of a computer as sent to a computer screen and converts it into alternative output. Typically, the alternative output is in the form of synthetic speech or Braille characters. Screen readers are particularly useful for a blind or low vision user. One such screen reader is JAWS for Windows developed and sold by Freedom Scientific, Inc. When installed upon a personal computer, JAWS provides access to the operating system, software applications and the Internet. JAWS includes a speech synthesizer that cooperates with the sound card in the personal computer to read aloud information appearing upon the computer monitor screen or that is derived through communicating directly with the application or operating system. Thus, JAWS provides access to a wide variety of information, education and job related applications. Additionally, JAWS includes an interface that can provide output to refreshable Braille displays. JAWS supports Internet Explorer and similar web browsers with special features, such as, links lists, frame lists, forms mode and reading of HTML labels and graphic labels included on web pages. Upon entering an HTML document via an Internet link, JAWS actuates a Virtual PC Cursor that mimics the functions of the PC cursor. The Virtual PC cursor causes JAWS to signal the speech synthesizer to speak the number of frames in a document being read in Internet Explorer and the number of links in the frame currently being displayed. Also, JAWS causes the speech synthesizer to read graphics labeled by alternate tags in HTML code. It should be noted that reference to JAWS is made as an example of a screen reader but the novel and non-obvious methods claimed herein are applicable to screen readers as a whole.

An objective of the present invention is to enable screen reader users to seamlessly hide, modify, and rearrange elements in the virtual view. Achieving this functionality is not inherently obvious or intuitive due to the technical challenges of modifying and rearranging document object model (DOM) nodes. JAWS cedes control of the tab order to the underlying application as much as possible. This helps to avoid differences in browser behavior with and without JAWS, and avoids the developer of a third party screen reader application like JAWS from solving a problem already solved by the browsers. If an element's type were customized as a result of this feature, its focusable characteristics might change. JAWS would have to alter or enhance the tab order to accommodate the customization. Implementing this behavior would involve a high level of complexity with a low confidence of reliability.

JAWS gathers the information it renders from two different sources depending on whether the user is reading by line or tabbing through the document. The line content comes from the DOM server, and tabbing content typically comes from the data retrieved from focus change events. If the DOM content were changed, JAWS would be unable to change the focused data correspondingly. Therefore, the user would hear conflicting information depending on how they navigated. Reconciling these two data sources would be complex and resource intensive.

Modifying or adding nodes to the DOM would change the node data in such a way that subsequent customizations would be based on previous customizations. This sort of interdependence would make rules less reliable because the order of operations would be critical for success. And any solution to the problem would likely increase the memory used by the DOM, slow down the loading of the virtual view, or both.

Depending on the screen reader application, rearranging nodes in the DOM may not be a practical solution. For JAWS, presentation of a node in the virtual view depends heavily on the properties of its ancestors. If those properties aren't present, the presentation in the virtual view is undefined.

For these reasons, the basic problem that modifying and rearranging the page was supposed to solve is overcome by a novel and non-obvious solution. This solution addresses the problem of helping visually impaired users quickly find and navigate the information they're interested in.

BRIEF SUMMARY OF THE INVENTION

One objective of the present invention is to allow low-vision and blind end users to quickly find the content on web pages they're looking for and remove content that interrupts the reading experience. This feature allows users to change the presentation of content in the virtual view in two ways: (1) users may hide sections of content; and (2) users may indicate the location on the page where they would like the screen reader application to start reading when the page loads. For example, many sites contain advertising frames. These frames are irksome for users because they disrupt the reading order of surrounding content. Using this feature, a user could hide these ad frames and thus obtain a smoother reading experience. Likewise, a user could have the screen reader begin reading at an ARIA main landmark region whenever one appears on a page because such a region likely contains the most interesting content.

An embodiment of the invention includes a method of modifying the presentation of web pages. A first web page is loaded into a screen reader application such as JAWS. An end-user navigable virtual cursor is established, the virtual cursor outputting content from the first web page to a non-visual medium such as text-to-speech and/or Braille. An end-user keystroke command is received responsive to the virtual cursor positioned at one or more web page elements having an identifiable property. In an embodiment of the invention, a mouse event may also effect the same end-user command as the keystroke. The identifiable property may be web page elements including countable items, named items and identified items.

Countable items are quantifiable by the user in the virtual view. They are controls such as links, buttons, and other interactive controls, as well as structural elements such as frames, graphics, headings, lists, and tables. This group does not include divs or spans because these items are undetectable in the virtual view. This group does not include paragraphs because they are generally so numerous as to make counting unreliable.

Named items include interactive or structural items with associated text as a prompt or content, such as links, headings, edit fields, frames, or graphics. This group does not include container elements such as lists or tables, but does include container children such as list items and table cells. This group does not include divs, spans, or paragraphs because these elements may contain large amounts of text. Identified items includes any element of any recognized type with either the "id" or "class" attributes.

A dialog box is presented responsive to an end-user keystroke command. The dialog box may be presented visually on the graphic user interface but it is just as importantly presented through the non-visual output such as Braille or text-to-speech. The dialog box includes a plurality of document object model node options, primarily: (1) hiding the one or more web page elements; and (2) initiating reading at the one or more web page elements. The one or more web page elements are enumerated to the end user in the dialog box, typically through a list box or tree control.

An end-user selection is received of the one or more web page elements subject to customization and a plurality of customization types for the user-selected web page element are enumerated, typically either hiding the web page element from the virtual view or skipping to the web page element and start outputting content at that element. An end-user customization type selection is received and saved as a rule to a non-transitory storage medium such as a local or remote hard drive. When a subsequent web page matching to the application scope is loaded into the screen reader application, an XPath expression according to the rule is applied to locate the element and the screen reader modifies the presentation of the second web page through the screen reader application.

An application scope of the rule may be set having at least three layers of granularity including page-specific, site-specific and all-sites application of the rule. A page-specific first rule will typically override a site-specific second rule and an all-sites third rule will be overriden both the page-specific first rule and the site-specific second rule. The one or more web page elements enumerated in the dialog box are ordered from the most nested to least nested nodes in a tree structure of the document object model. In an embodiment of the invention the screen reader application excludes web page elements hidden by the applied rule from the tab order. The screen reader application may also broadcast an audible cue responsive to loading the second web page having an applied rule. The audible cue is preferably a non-obtrusive sound such as a "ding" that is played upon loading a page that has been modified by the screen reader according to a rule.

In an embodiment of the invention, the rule is initially designated temporary and only applied within a first browser tab or window wherein the end user may evaluate how the temporary rule modifies the output of the affected web page versus a second browser tab or window presenting an unaffected version of the web page before making the rule permanent In yet another embodiment of the invention, the end user may be provided the flexibility to define their own XPath expression. In this embodiment a custom XPath expression text input control is presented to the end user and an XPath expression string is received from the control. Since the string is a free-form it is possible that some attempts at XPath expressions may be invalid. Therefore, responsive to an exception in the XPath expression, the exception is communicated to the user and responsive to a valid XPath expression, the end user is prompted to save the XPath expression as a custom rule. The custom rule is saved and applied to subsequent web pages according to the application scope designated by the end user. A custom XPath expression may match more than one node in the document object model. Therefore, an embodiment of the invention includes the step of counting the number of matching web page elements returned by the XPath expression and communicating an integer count result to the user prior to saving the XPath expression as the custom rule.

In yet another embodiment of the invention, a screen magnification application is enhanced by automatically moving the visual focus to the DOM node selected by the end-user. Visually impaired users that employ screen magnification frequently cannot navigate as easily about a document such as a web page. If the user always has to scroll or pan down to the same web element (such as a heading for an article) they are at a disadvantage over a user that does not have to magnify the screen and hunt for the same starting point. In this embodiment of the invention, the same XPath expression would find the web page element selected by the end-user and the screen magnification software would automatically scroll, pan, and/or zoom to that node in the DOM. To the end-user, the screen magnification software would automatically "jump" to a preselected point in the document. An additional feature includes providing the magnification application user the ability to associate a magnification level with a particular web page element. For example, if every day the end user wants to see the exchange rate of the U.S. dollar versus the Euro and a web page puts that in an identifiable web page element, the user may automatically set the zoom level to 10× when that web page is loaded and also set visual focus on that web page element (i.e., a named frame).

An advantage of the present invention is that the screen reader provides a layer of abstraction and normalization between otherwise differing browser DOMs. Because the web page is interpreted under the DOM of the screen reader, the invention is independent of whatever browser software is deployed by the end user.

The computer readable medium described in the claims below may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, radio frequency, etc., or any suitable combination of the foregoing. Computer program code for carrying out operations for aspects of the present invention may be written in any combination of one or more programming languages, including an object oriented programming language such as Java, C#, C++ or the like and conventional procedural programming languages, such as the "C" programming language or similar programming languages.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

BRIEF DESCRIPTION OF THE DRAWINGS

For a fuller understanding of the invention, reference should be made to the following detailed description, taken in connection with the accompanying drawings, in which:

FIG. 7 is a table showing non-visual output with and without the rule applied for comparison.

DETAILED DESCRIPTION OF THE PREFERRED EMBODIMENT

Figure 1:
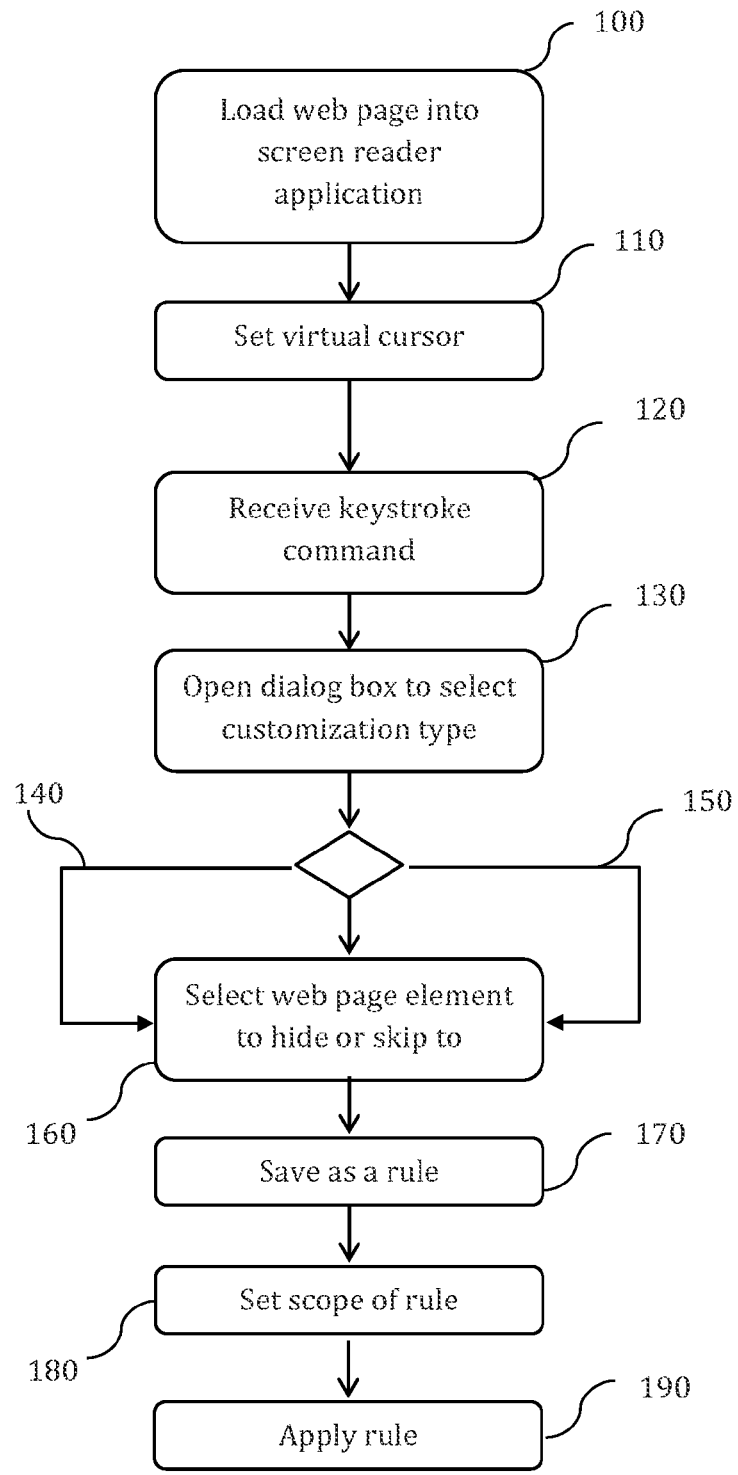
FIG. 1 is a flowchart showing an embodiment of the invention.
Figure 2:
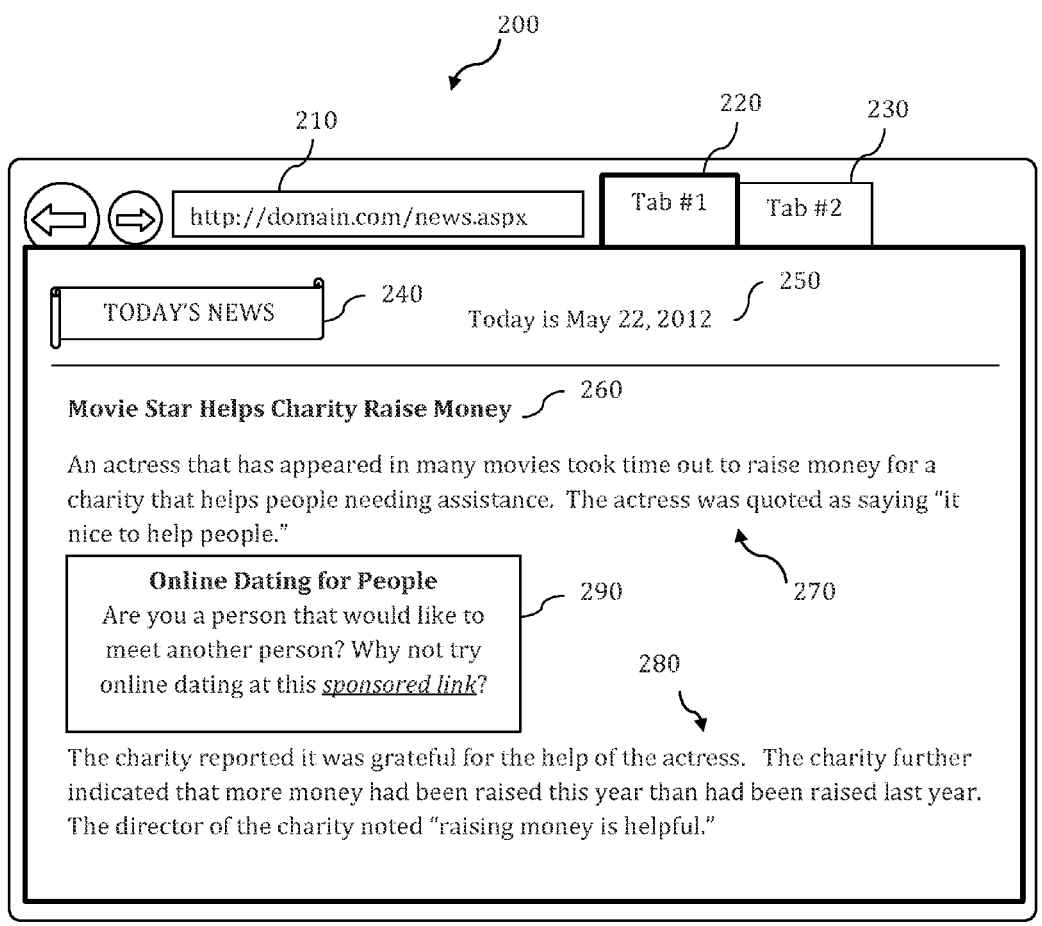
FIG. 2 is a graphic user interface screen showing an illustrative web page processed by a screen reader application.

The method for an embodiment of the invention is generally shown in FIG. 1. A web page is loaded into a screen reader application 100 such as JAWS. The end user (typically a visually impaired user) sets the virtual cursor on a web page element 110. The end user may decide that in the future they would like to start reading at that web page element. Alternatively, the end user may decide the web page element is distracting and wishes to suppress the speech or Braille output of that element in the future. The end user executes a keystroke command 120 which opens a customization type dialog box 130. The dialog box 130 displays a plurality of document object model node options selected from the group consisting of hiding 140 the one or more web page elements and initiating reading 150 at the one or more web page elements. A control such as a mutually exclusive check box, radio button group or like accepts an end user selection. The dialog box then enumerates 160 the one or more web page elements to the end user in the dialog box. If no identifiable web page element can be found at the location of the virtual cursor, an exception may be handled with a message to the user to navigate further. Alternatively, the closest web page elements to the virtual cursor may be enumerated. As some web page elements may be nested inside of others, the virtual cursor may be at a location with numerous elements for the end user to select. This step is necessary because a single virtual PC cursor location may indicate more than one element. For example, a link may be contained within a heading. This step exists so the user can disambiguate which of those two elements, the link or the heading, they wish to customize.

A plurality of web page elements may be presented in a flat list such as a list box or may be presented in a tree control to convey the hierarchical relationship between nested web page elements which would correspond to the DOM. After selecting the web page element to hide or skip to (160), the end user may save the selection as a temporary or permanent rule 170. The temporary rule may be applicable only to the current tab or browser window. That way, the user may test how the page is output with the rule applied in a first tab window to how the page is output without the rule applied in a second tab window. The user may also make the rule permanent and type in a string description of the rule for referencing it in the future. The end user may set the scope of the rule 180 which may include options to set it only to the particular page or URL; set it to the site (the domain); or have the rule apply to any web page. Finally, the rule is applied 190 automatically according to its parameters by querying the DOM of the web page using an XPath expression generated from the rule parameters thereby leaving the DOM structure intact.

An exemplary user experience is demonstrated in FIGS. 2-12. Starting at FIG. 2, a generic web browser interface 200 is shown displaying a fictional web news web page. The URL 210 sets a path to document news.aspx which is presented in first tab 220 which is active in the foreground. Second tab 230 is in the background and not viewable in the current browser state. The content of the web page includes a banner graphic 240 that is a bitmap showing the text "TODAY'S NEWS." However, an ALT tag for the graphic is more verbose reading "Today's News is the newest news you can get from any news website." There is also a date string 250 in the header of the website that reads in the example, "Today is May 22, 2012." A horizontal line (<HR> tag) separates the header from the first article on the page having a title tagged with a header stylization (<H1>). The title 260 reads "Movie Star Helps Charity Raise Money." The text of the article is split into a first part 270 and a second part 280 by frame 290 identified with by the HTML id "Social." A sighted user generally has no issue skipping frame 290 by visually skimming from first part 270 to second part 280 of the article. However, as the low vision user operates the virtual cursor via the screen reader, the flow of the article becomes disruptive and frustrating to the end user as they are essentially "ambushed" by unexpected content.

The present invention discloses two options for the user to optimize relevant non-visual output from a screen reader processing a web page: (1) start the output at a particular web page element; and/or (2) skip certain web page elements. FIGS. 3-7 illustrate an embodiment of the invention that initiates non-visual output at a specific web page element. FIGS. 8-12 illustrate an embodiment of the invention that suppresses non-visual output of user-specified web page elements. It should be noted that no changes are made visually in the web browser GUI nor is the DOM rearranged or modified. The present invention provides a layer of abstraction between the DOM and the non-visual output sent to a speech synthesizer and/or Braille display. XPath expressions are generated by the screen reader software against the DOM to find the nodes to either start reading or to hide.

Figure 3:
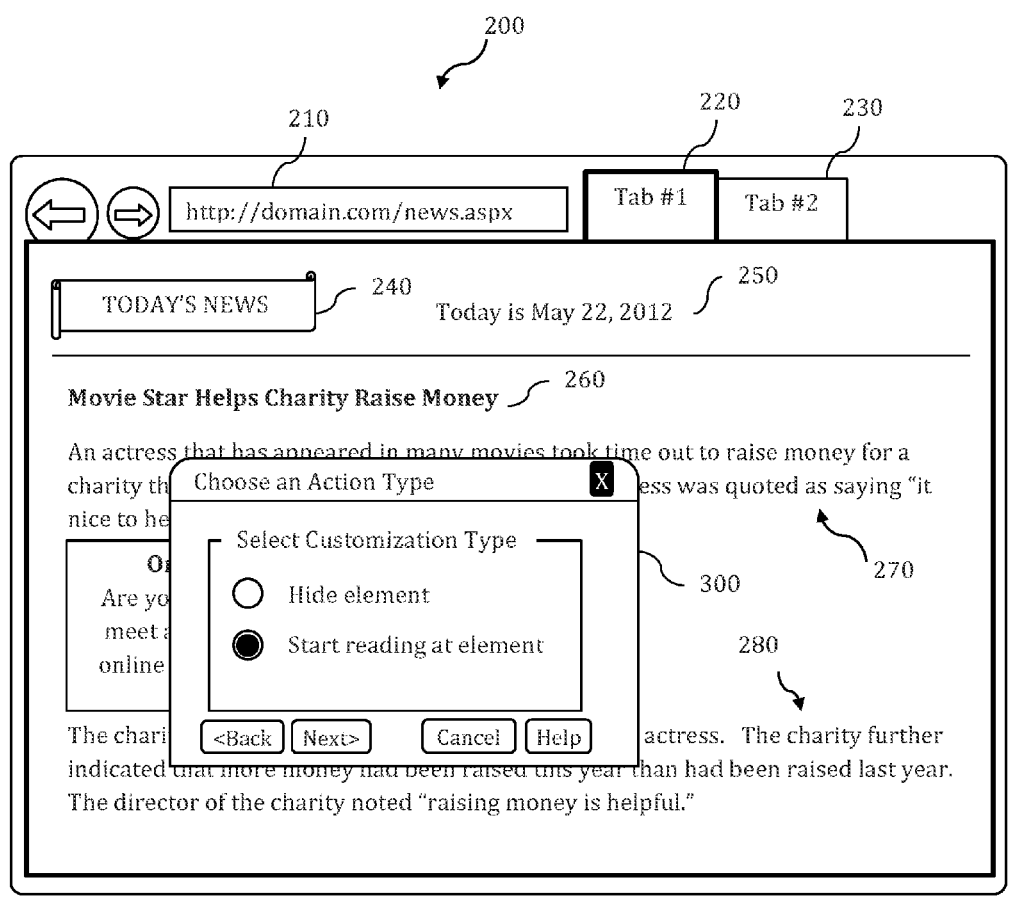
FIG. 3 is a graphic user interface screen showing a modal dialog box for an end-user selection of action type.
Figure 4:
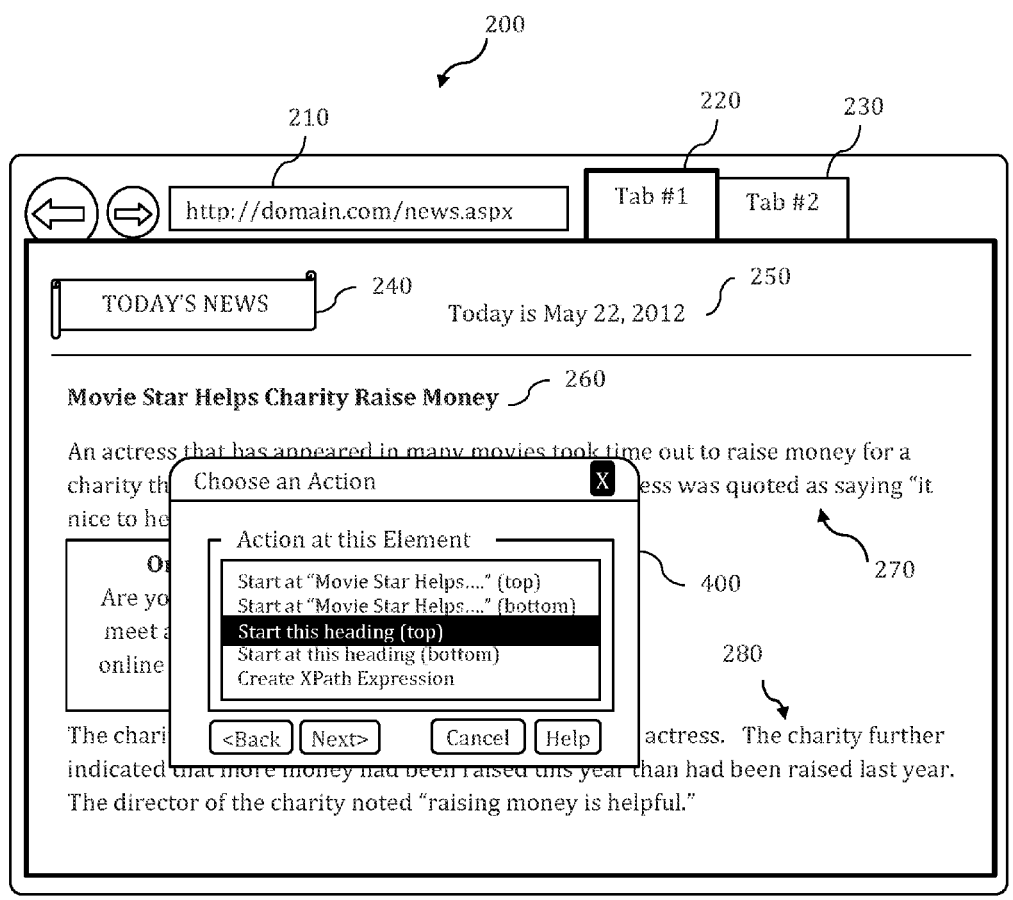
FIG. 4 is a graphic user interface screen showing a modal dialog box for an end-user selection of a web page element action to apply.

Turning now to FIG. 3, the end user has grown weary of hearing the ALT tag description to banner 240 and doesn't need to hear date string 250 every time he listens to the news output through the screen reader (and/or output to Braille). With his virtual cursor on title 260 he depresses a keystroke combination which brings up Action Type Dialog 300. The screen reader software has already fired a function to determine whether an identifiable web page element exists at the location of the virtual cursor. It finds that title 260 qualifies and presents an option to the user to select a customization type consisting of hiding the web page element or start reading at the web page element. In Action Type Dialog 300, the user has selected a radio group option to start reading at the web page element. Action Type Dialog 300 may be initially launched with the "Next" button disabled until a valid radio button selection is made. The "Back" button may be also disabled at this point or even rendered invisible. When the end user selects the "Next" button the screen in FIG. 4 is shown. Choose Action Dialog 400 enumerates in a list box five potential options to the end user. The first two options use string matching XPath queries to find headings that contain alphanumeric characters matching title 260 on the current web page. However, end user wishes to start reading news articles on this page at title 260 regardless of the content of the title which will tend to change frequently for news websites. Another option enumerated is for the end user to create his own XPath expression.

Figure 5:
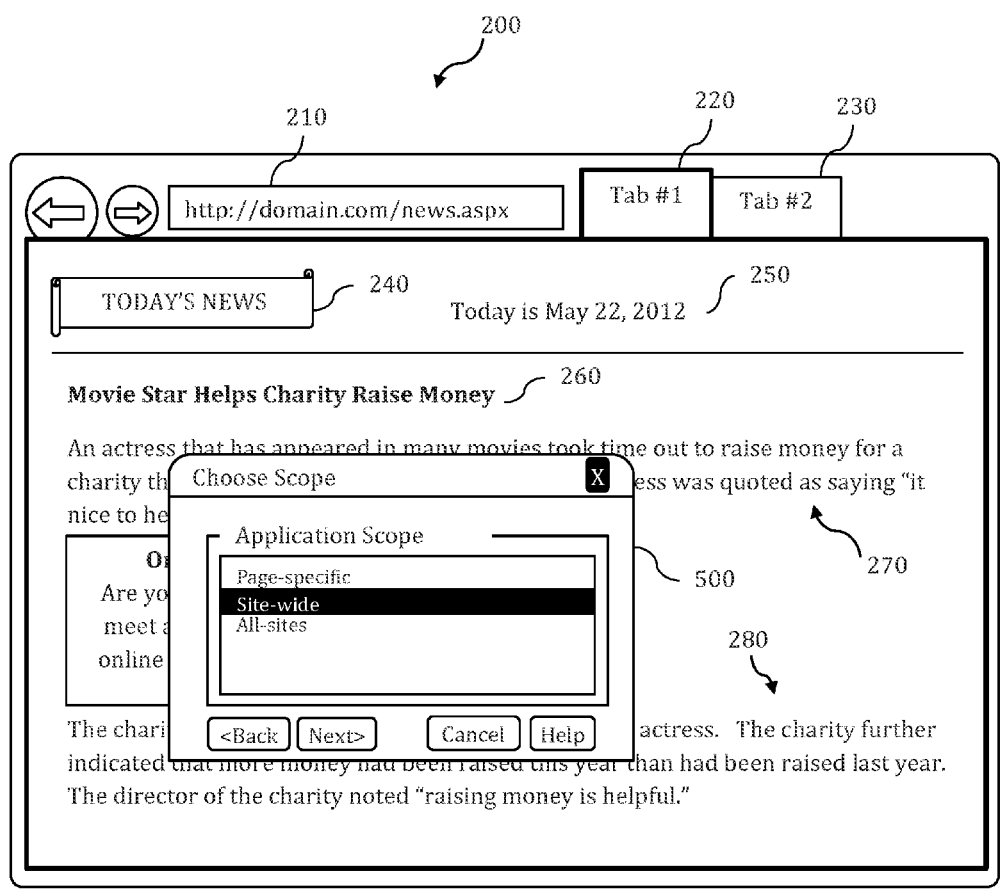
FIG. 5 is a graphic user interface screen showing a modal dialog box for an end-user selection of application scope.

In FIG. 5, Application Scope Dialog 500 prompts the user for where the rule should be applied: (1) page-specific; (2) site-wide; or (3) across all websites. The end user in this case decides to apply the rule site-wide.

Figure 6:
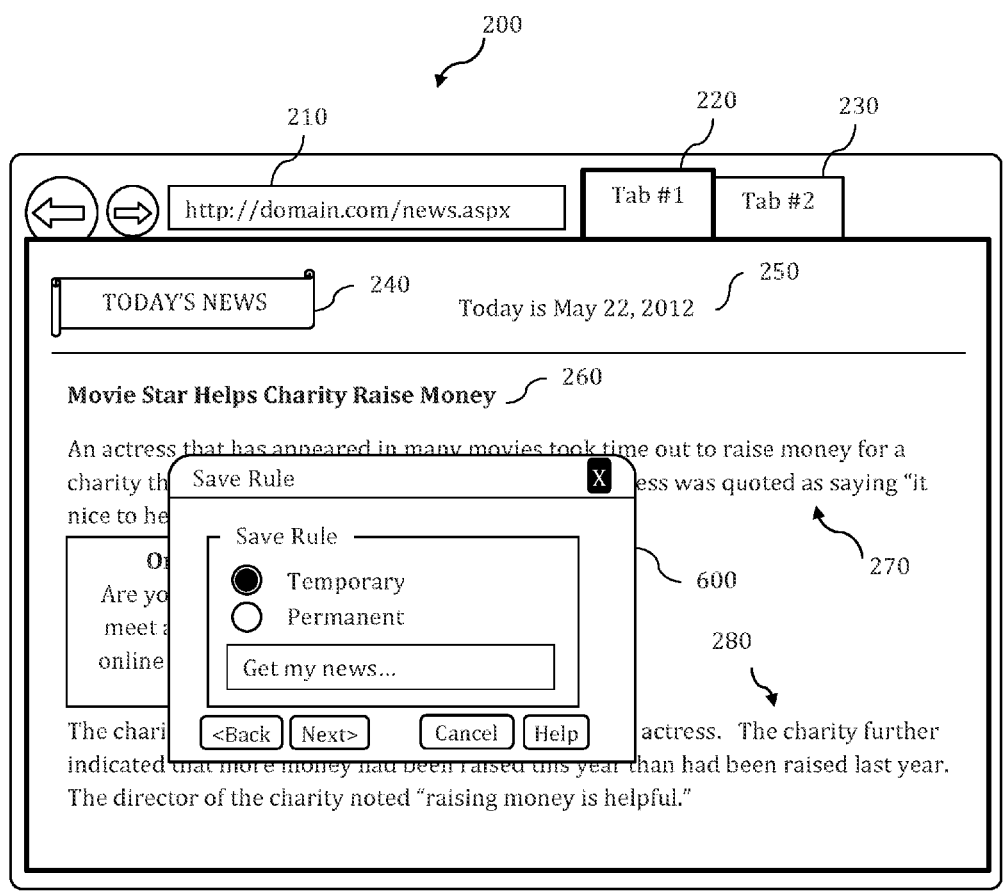
FIG. 6 is a graphic user interface screen showing a modal dialog box for an end-user selection to set the rule state and name.

In FIG. 6, the Save Rule Dialog 600 queries the user for a description of the rule for which he entered "Get my news . . . " The user may also apply the rule on a temporary or permanent basis. The user selected temporary so that the rule is applied in first tab window 220. The user can then switch to the same website URL on second tab window 230 and compare how the page is non-visually output without the rule being applied. Once the user is satisfied that the rule has achieved the end-user experience sought, the user may make the rule permanent so it is applied in any tab or window bringing up that site and meeting the conditions set forth in the rule.

FIG. 7 shows a comparison of the non-visual output without the rule applied 700 versus having the rule applied 710 which skips banner graphic 240 and date string 250. Without the rule applied, one hundred and twenty two (122) words are output to the speech synthesizer or Braille display. With the rule applied, one hundred and three (103) words are output. For pages and sites that are repeatedly accessed by the end user, this reduction in verbosity can lead to greater convenience, efficiency and productivity for a low vision user.

Figure 8:
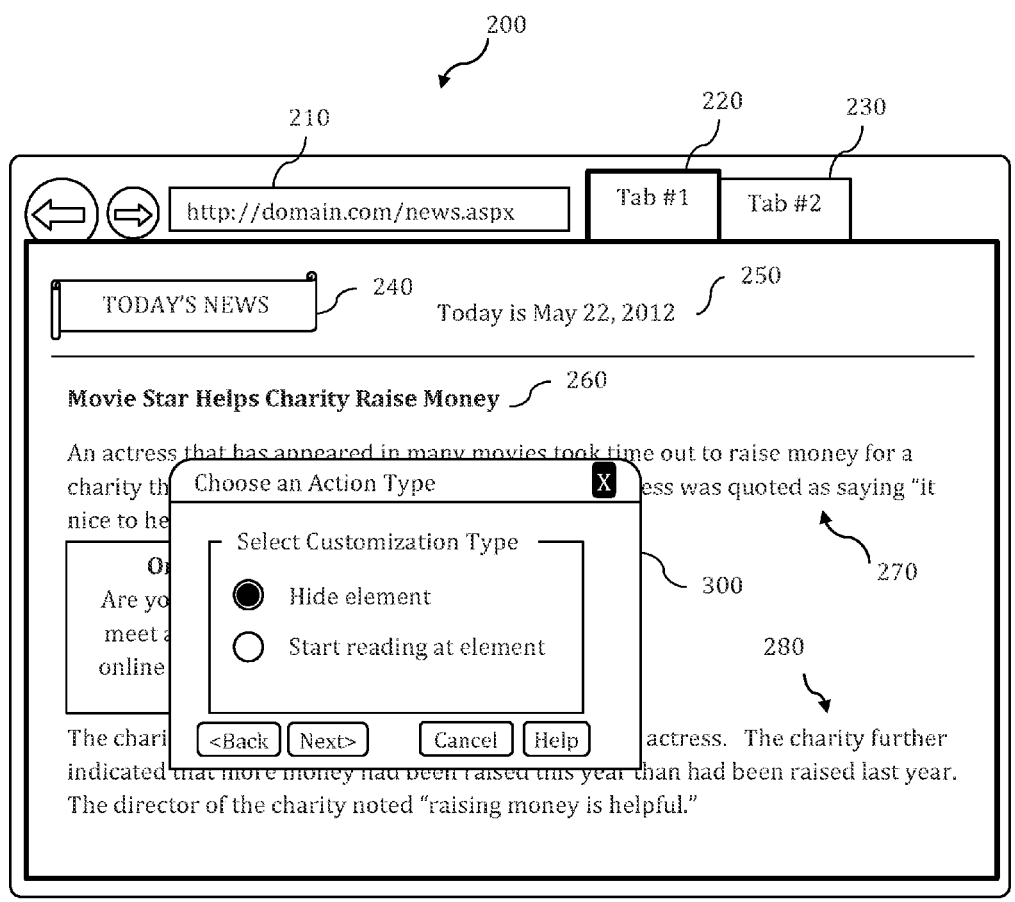
FIG. 8 is a graphic user interface screen showing a modal dialog box for an end-user selection of action type wherein hiding an element is selected.
Figure 9:
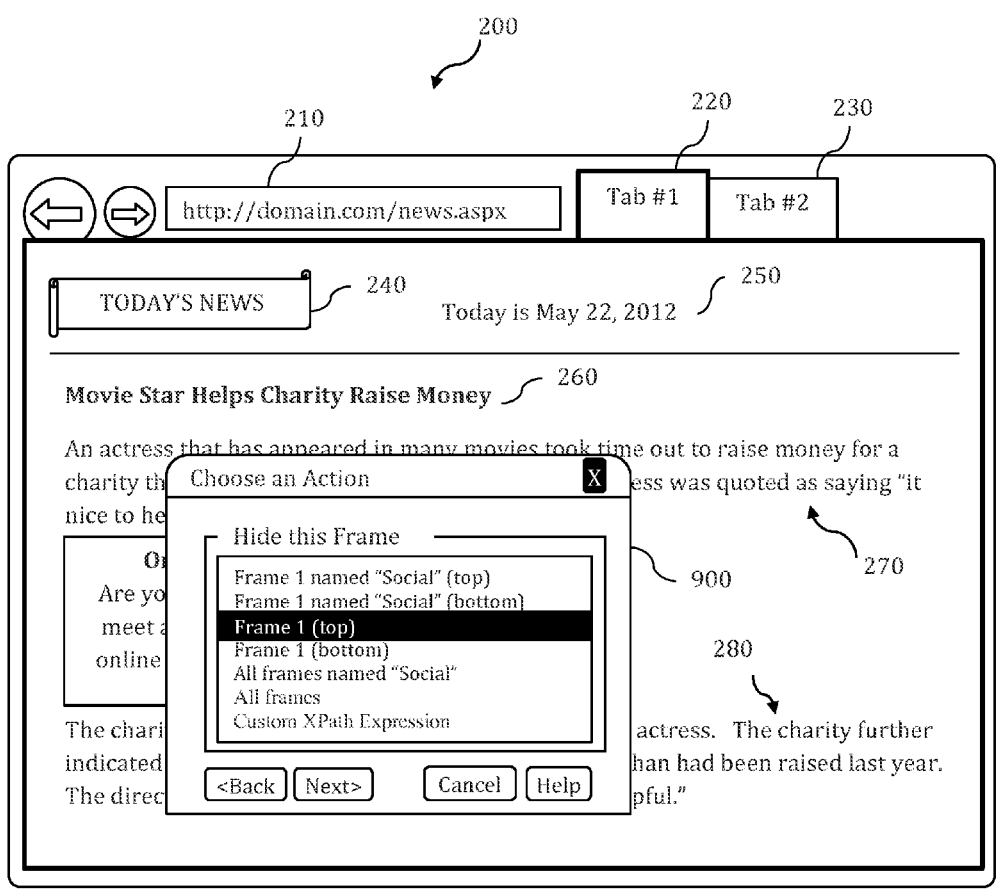
FIG. 9 is a graphic user interface screen showing a modal dialog box for an end-user selection to hide a frame.
Figure 10:
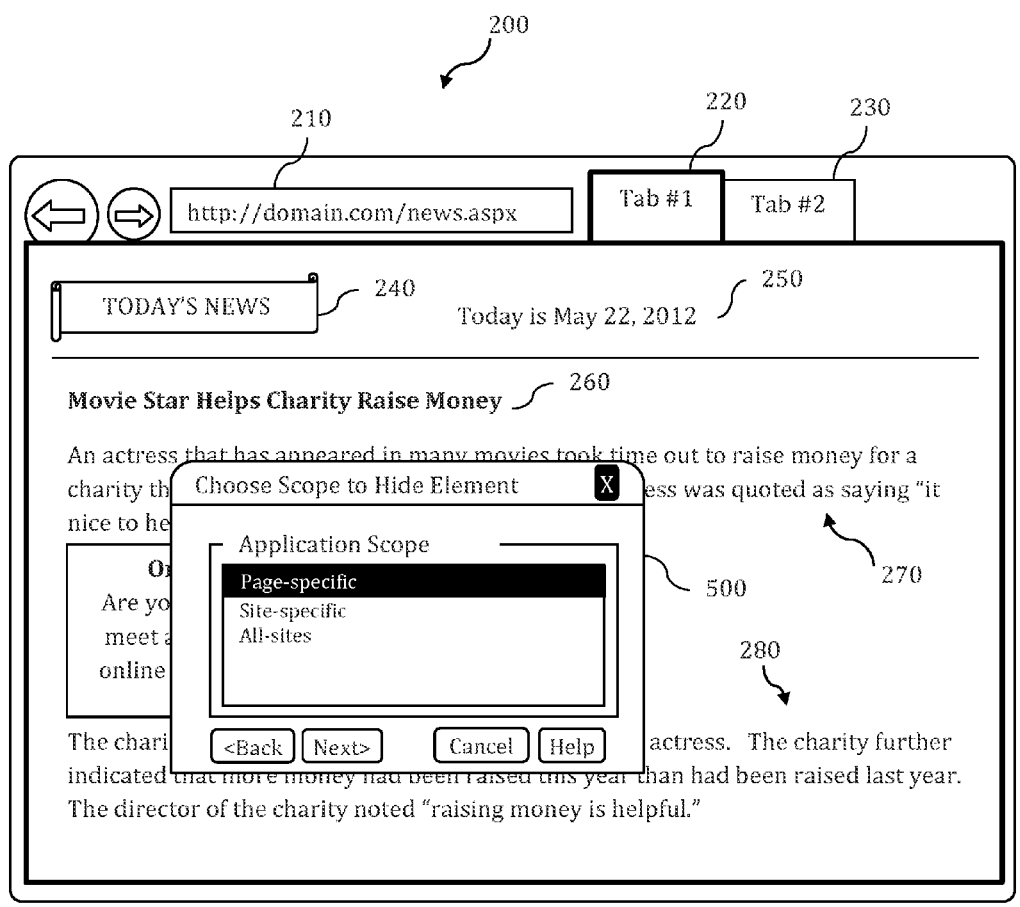
FIG. 10 is a graphic user interface screen showing a modal dialog box for an end-user selection of the scope in which to apply the rule.
Figure 11:
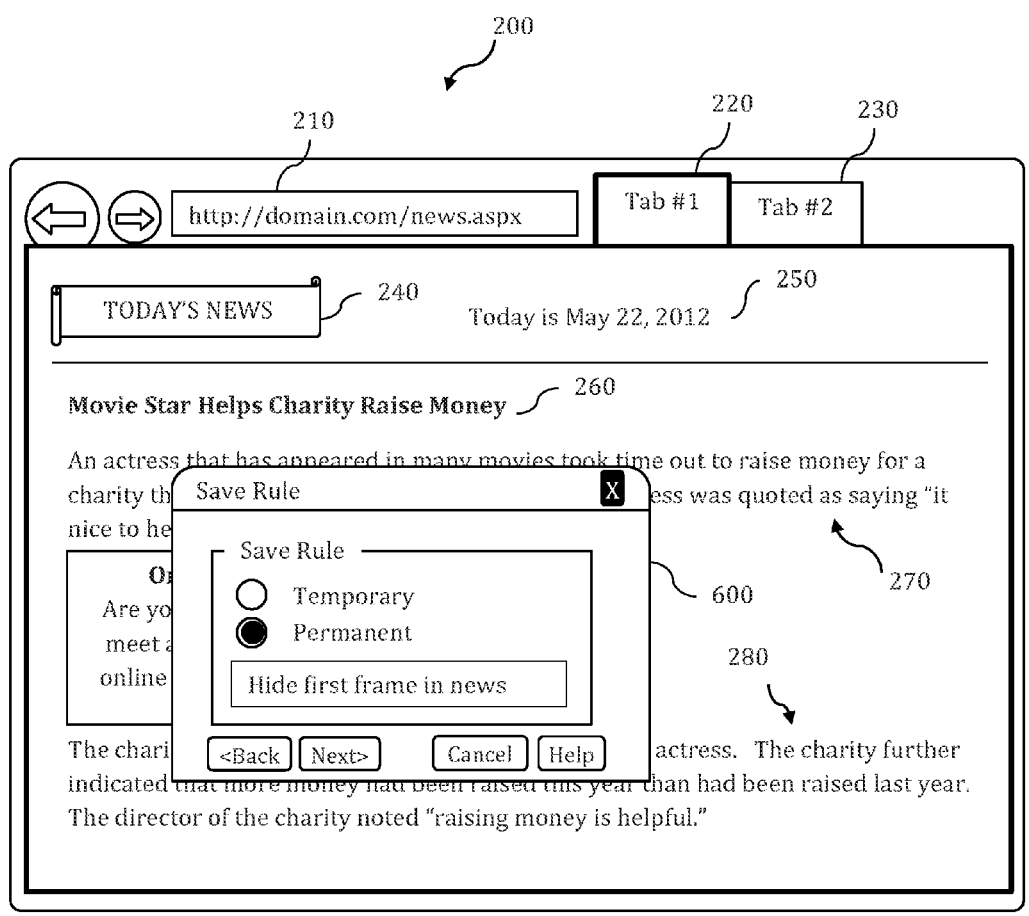
FIG. 11 is a graphic user interface screen showing a modal dialog box for an end-user selection to make the rule permanent.

Turning now to FIG. 8, the user will now hide an element that is disruptive to their reading experience. The user locates the frame named "Social" in the virtual view. The user presses the same keystroke combination as before. This time, when the screen reader application asks what type of customization the user would like to create, the user selects "Hide element" from Action Type Dialog 300. From the possible customizations shown in Hide Element Dialog 900 in FIG. 9, the user selects the list item "Frame 1 (top)" and presses the next button to continue. The user selected the item because the user doesn't want to see a frame interspersed within the article, no matter what the content of the frame. In FIG. 10, the user selects a "page-specific" application scope. In FIG. 11, the user makes the rule permanent and names it "Hide first frame in news."

Figure 12:
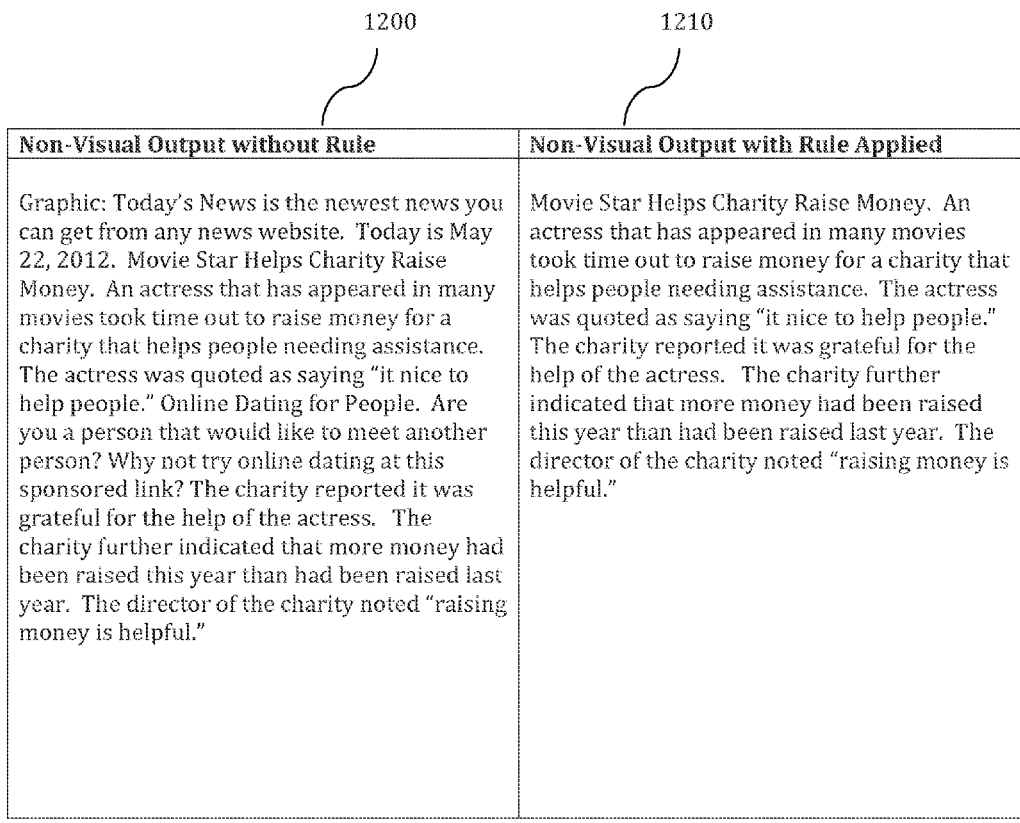
FIG. 12 is a table showing non-visual output with and without the frame-hiding rule applied for comparison.

The user presses the finish button and focus is returned to the virtual view. The disruptive frame is no longer in the virtual view between the title of the article and the text of the article. In FIG. 12, a comparison of the non-visual output without the rule 1200 is shown with the non-visual output with the rule applied 1210. Without any rules applied one hundred and twenty two (122) words are output to the speech synthesizer or Braille display. With the rule applied (in addition to the previous rule skipping to the title of the article) the verbosity of the non-visual output is reduced to seventy-nine (79) words.

In an embodiment of the invention, customizations are temporary so that the user can quickly undo them if they have an adverse effect. If a user doesn't like the result of a customization they've just made, they can remove the customization and the screen reader will restore the virtual view without the most recent customization. Should the user indicate a desire to save the temporary customization, the screen reader then presents a dialog where a user can give a name to the set of temporary customizations, also known as a rule.

An embodiment of the invention includes the ability to apply existing rules to new web pages. For example, a user is reading a news story on a different site from the site described in FIGS. 2-6, and 8-11. However, the articles on the new site have the same basic format as the first site. The user simply applies the rule they created for the first site to the second site without having to recreate the specific customizations. In a dialog box, a tree view containing all the sites and pages for which the user has previously made customizations is displayed. Always included in this tree is an item representing the current site and the current page. Next to the tree on the right is a list box containing all the rules the user has created. Each rule has a checkmark or not depending on whether or not that rule is supposed to apply to the site or page selected in the tree. The user selects the current site in the tree view, and tabs to the list of rules. Previously, the user created a rule named "Get my news . . ." This rule is in the list, but it is unchecked because so far, this rule does not apply to the new site. The user presses the spacebar to check the item. Now, whenever the user visits the new site, the screen reader will apply the rule for news articles the user created earlier for the first site to the second site.

In an embodiment of the invention, hidden elements do not appear in the virtual view nor in the tab order or the list of elements (e.g., list of links). Hidden elements are skipped over during quick key navigation and are not announced as part of the page summary. For example, if a page contains 10 headings, and 5 of these are hidden, the screen reader will announce that the page has 5 headings as part of the page summary.

In yet another embodiment of the invention, an option to copy or not copy hidden content is provided. Selection of content which contains hidden elements is dependent on "Virtual Cursor"→"Select and Copy" option. If this option is set to "Full content using onscreen highlight", the selection will include hidden elements as if they were not hidden. If this option is set to "From Virtual Cursor", the selection shall not include hidden elements as if they were not hidden.

When a page loads, the screen reader positions the virtual PC cursor at the specified location in the virtual view. If the user sets the start reading location to an element for which the screen reader would normally go into when in a forms mode, forms mode will be turned on.

The following section describes the process of how rules apply to sites and pages on the web. A "setting" is the saved piece of information that indicates whether or not a given rule applies to a given site or page. Settings for each rule apply individually, and changing the settings for one rule does not affect the settings of any other rule. The screen reader offers three options for where rules apply: all sites, specific sites, and specific pages. The user may enable or disable a rule to any or all of these areas. For example, a user might want to apply a rule that hides ads for all sites. He or she may then want to apply a rule which hides all frames only for a specific site. Settings which are not present for specific pages inherit settings for specific sites. And settings which are not present for specific sites inherit settings for all sites. In other words, if a user has not specifically changed the page or site setting for a given rule, application of the rule will be determined by the all sites setting.

Page specific settings override site specific settings, which override all sites settings. For example, if a given rule has been specifically enabled or disabled for a given page, the screen reader application follows the rule's setting for the page and ignores the settings for the site and all sites. A user may want to hide certain ads for all sites, but want to see those ads on a specific website, (e.g., MySite.com). In that case, the rule for hiding ads would be enabled at the all sites level, but disabled at the site level for MySite.com.

The screen reader runs XPath expressions against the DOM tree as if no customizations had been made. This insures that the order in which customizations are made does not affect the validity of subsequent XPath expressions. To illustrate the problem, say a user chooses to hide the first list on a given page. If the user then wishes to hide the next list on the same page, which list are they hiding: the first or the second? If the screen reader performed a customization based on the first rule, the user would have to hide the first list then hide the next list. This item in the requirement exists to help avoid the inevitable confusion this would cause and to avoid the unnecessary complication of running rules in a specific order.

While there may be multiple rules for setting the starting location in the virtual view, the screen reader will only honor the first matching rule of this kind because there cannot be two starting positions. Page specific rules are processed before site specific rules, which are processed before the rules for all sites. This ensures that more specific settings take precedence over more general ones. The screen reader will ignore rules which set the starting location in the virtual view to an element which has been hidden by rule.

Temporary customizations only apply to the browser tab or window in which they were created. This is so that the user can have the same page loaded in two browser windows at the same time, trying customizations in one window while leaving the other unchanged. Because the DOM hierarchy is not guaranteed to be the same between browsers, the screen reader saves rules and settings on a per-browser basis. When page loads and its content is modified due to rules, the screen reader may play an unobtrusive sound that indicates that the page has been modified.

Advanced users familiar with XPath may want to create customizations that are beyond the ability of the screen reader to predict. For example, a user may want to always hide the first frame after the first level 1 heading on the page. The user can write their own XPath expression to specify that specific element.

The XPath queries for hiding and starting at a given location are the same. It doesn't matter if the query for starting at a location matches multiple elements, the screen reader will simply use the first match it finds.

Figure 13:
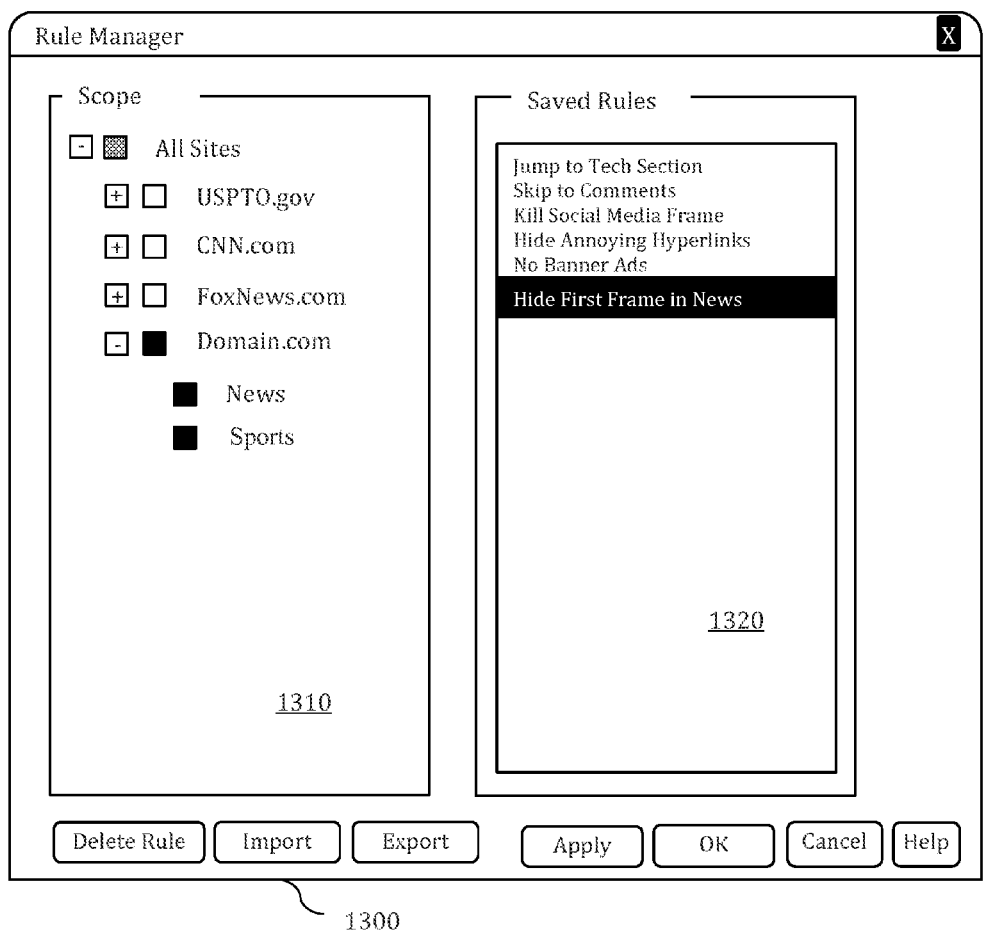
FIG. 13 is a graphic user interface showing a dialog box for adjusting the settings of existing end-user defined rules.

In FIG. 13, a Rules Manager dialog box 1300 is shown with a tree control 1310 on the left and a list box of saved rules 1320 on the right. Tree control 1310 enumerates the various levels of scope including "All Sites"; domain level; and page level. Until the wizard interface employed by the end-user originally, the actual domain names and page names are enumerated in tree control 1310. List box 1320 enumerates the saved rules by end-user defined strings. The selected item is named "Hide First Frame in News." Because that is selected in the list box, the setting for its scope are enumerated. Under the "All Sites" node, the check box is set as gray, the "Domain.com" checkbox is black and the two pages under "Domain.com" have checked nodes. This allows the end user to quickly understand and adjust the scope of a rule. For example, if the end-user wished to apply the rule over all sites, he would click the grayed-check box node and turn the check box black. That would also cause all the check boxes in the entire tree control to be fully checked. Alternatively, the end user could "uncheck" the Sports page under "Domain.com" which would make the check box at the "Domain.com" node turn gray while the check box at the News page would remain fully checked (black). Rules may be deleted or exported. Additional rules may be imported as well.

Glossary of Terms

Accessible Rich Internet Applications (ARIA) is a technical specification published by the World Wide Web Consortium that specifies how to increase the accessibility of web pages, in particular, dynamic content and user interface components developed with Ajax, HTML, JavaScript and related technologies. ARIA describes how to add semantics and other metadata to HTML content in order to make user interface controls and dynamic content more accessible. For example, with WAI-ARIA it is possible to identify a list of links as a navigation menu and to state whether it is expanded or collapsed. ARIA markup was designed to insert information useful to assistive technologies into existing HTML code. It exists as a way to label controls and to provide information about their states. But adding ARIA support to a Web page does not change the presentation or behavior of that Web page to sighted users. For example, adding the ARIA role of "checkbox" to a "div" tag within a Web page will produce no visible effect on the page. Instead, if there is a check box on the page which has been rendered without using the "input" tag, the ARIA role of "checkbox" can be added to the code to inform assistive technology users that a check box appears at that point on the page. The browser plays a big role in interpreting ARIA markup. Most browsers support some type of accessibility API (application programming interface), and assistive technologies use the API to get information about what is presented on the screen. So, ARIA markup is transformed by the browser into information that fits the accessibility API it supports. Then, the information provided by the API is consumed by the assistive technology. That means screen reader support of ARIA depends significantly on the browser being used.

All-Sites application scope applies a customization rule to all web pages processed by the screen reader application. Generally, page-specific application will override conflicting settings that are site-specific or all-sites wide.

Application Scope refers to how broad a customization rule is applied. For example, application scope may be limited to a single web page, a website or may be applied universally across any web page.

Apply: a rule is said to "apply" when the end-user has specified that the rule in question is to run its customizations on a given site or page. A rule "applies" to a site or page even when its customizations are unable to change the virtual view or the screen reader behavior. Likewise, a rule whose customizations could cause changes to the virtual view or screen reader behavior may not necessarily "apply" to a given site or page.

Audible Cue is an unobtrusive sound that may be played in sequence or concurrently with text-to-speech or Braille to indicate the web page being output has been modified by a customization rule.

Braille is a method that is widely used by people who are visually impaired to read and write. A Braille display is an electronic, pin-actuated, computer controlled peripheral that outputs Braille to a visually impaired user. Examples include the FOCUS 40 and FOCUS 80 Braille displays designed, manufactured and sold by Freedom Scientific, Inc.

Countable Items are repeating web page elements that are countable by the end user in the virtual view. They are controls such as links, buttons, and other interactive controls, as well as structural elements such as frames, graphics, headings, lists, and tables. This group does not include DIV or SPAN HTML markups because these items are undetectable in the virtual view. This group does not include paragraphs because they are generally so numerous as to make counting unreliable.

Customization: A single user-defined change to the virtual view such as hiding or inserting a starting location, coupled with a single XPath expression describing the elements to be changed.

Dialog Box is typically a separate window generated in a software application that presents information to an end user and more often, presents options for an end user to select. A modal dialog box restricts activity to that box and does not permit other interaction in the software application until the modal dialog box is closed. For the purposes of this patent specification, the dialog box may be presented on the graphic user interface but will also be identified by non-visual output via the screen reader to convey selection options to the end user.

Document Object Model (DOM) is a cross-platform and language-independent convention for representing and interacting with objects in HTML, XHTML and XML documents. When an HTML page is rendered in a browser, the browser parses the markup (e.g. HTML), downloaded from the web-server into an in-memory DOM. The DOM is used to construct additional internal structures used to display the page in the browser window.

DOM Tree is an organizational structure of DOM documents having a tree structure with nodes. The top node in the DOM tree is the document object and each node under the document object has zero or more child nodes.

Element type: The property of an element which most strongly determines its presentation and interaction characteristics, e.g., button, checkbox, heading, link, paragraph, table, text, etc.

End user: is the person controlling the screen reader software. For the purposes of this patent specification, user and end user are used interchangeable. User and end user should not be confused with a developer or author . . . one that programs software code or a website designer or content generator that authors a web page.

Identifiable Property is a specific piece of data associated with an element that allows the screen reader software to differentiate one element from other similar elements.

Identified Items are any web page element of any recognized type with either the "id" or "class" attributes.

Keystroke Commands are one or more keystrokes typically made on a QUERTY-type keyboard for executing a procedure or function on the screen reader software. Keystroke commands are particularly useful for screen reader manipulation as the visually impaired end user can navigate a keyboard far more reliably than setting a coordinate-based pointing device indicia over a specific graphic user interface control.

Named Items are web page elements that include interactive or structural items with associated text as a prompt or content, such as links, headings, edit fields, frames, or graphics. This group does not include container elements such as lists or tables, but does include container children such as list items and table cells. This group does not include DIVS, SPANS, or paragraphs because these elements may contain large amounts of text.

Nodes are structure points in a document object model (DOM). Everything in an HTML document is a node. The entire document is a document node. Every HTML element is an element node. The text in the HTML elements are text nodes. Every HTML attribute is an attribute node. Comments are comment nodes.

Non-Visual Medium means a communication methodology that does not rely on visual acuity which would be required for computer screens and monitors. Non-visual mediums include tactile devices such as Braille displays and audio devices such as text-to-speech synthesizers and/or sound cues.

Page-specific application scope applies a customization rule only to a specific web page URL. Generally, page-specific application will override conflicting settings that are site-specific or all-sites wide.

Rule: A named set of customizations.

Screen Magnifier is a software application that interfaces with a computer's graphical output to present enlarged screen content. It is a type of assistive technology suitable for visually impaired people with some functional vision. Visually impaired individuals with little or no functional vision usually use a screen reader (see below). Screen magnifiers may also be used in conjunction with screen readers to both enlarge screen content and output said content to Braille or speech.

Screen Reader is a software application that attempts to identify and interpret what is being displayed on the screen (or, more specifically, sent to standard output, whether a video monitor is present or not). This interpretation is then re-presented to the user with text-to-speech, sound icons, or a Braille display device.

Site-specific application scopes applies a customization rule to an entire site. This would generally be a domain. For example, a customization rule that starts reading at the first header and skips advertising frames that disrupt the news story may be applied site-specific to the CNN.com domain.

Storage Medium is generally a hard drive or memory device whether local or remote to save and retrieve data and settings.

Tab Order: When an end user tabs from field to field in a form the tab order is the order the fields appear in the HTML code. However, sometimes the HTML author may want the tab order to flow a little differently. In that case, he/she can number the fields using the attribute TAB INDEX. The tabs then flow in order from lowest to highest.

Virtual Cursor is used to read and move through HTML pages in a screen reader application. A virtual cursor is invisible to sighted users, but screen reader users can use this cursor to read and select text and move to different elements on the page.

Virtual view: The content a screen reader provides using a virtual cursor; this is typically web-based content.

Web Page is a document or information resource that is suitable for the World Wide Web and can be loaded and accessed via a web browser and displayed on a monitor or mobile device. This information is usually in HTML or XHTML format, and may provide navigation to other web pages via hypertext links.

Web Page Element: A single feature of web page content, e.g., link, heading, frame, etc. Elements may contain other elements, e.g., frames may contain links.

XPath is a query language for retrieving nodes from an XML document and may also be used to computer values from the content of an XML document. The XPath language is based on a tree representation of the XML document, and provides the ability to navigate around the tree, selecting nodes by a variety of criteria.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

What is claimed is:

1. A method of modifying the presentation of web pages following a document object model, the method comprising the steps of:
    loading a document object model (DOM) of a first web page into a screen reader application, the first web page having a plurality of web page elements including a first web page element and a second web page element;
    establishing an end-user navigable virtual cursor, the virtual cursor used for outputting content from the first web page to a non-visual medium selected from the group consisting of text-to-speech and Braille;
    receiving an end-user command responsive to the virtual cursor positioned at the second web page element, the end-user command establishing a rule to exclude the second web page element from a non-visual output of the first web page;
    saving the rule for excluding the second web page element from the non-visual output of the first web page;
    subsequently loading the DOM of the first web page into the screen reader application upon subsequent loading of the first web page into a browser application;
    outputting the first web page to the non-visual medium using the subsequently loaded DOM of the first web page using the screen reader application to traverse through the plurality of web elements of the subsequently loaded DOM, wherein the second web page element is excluded from traversal by applying the rule, and wherein each traversed web page element is audibly or tactilely output to the end user; and
    wherein exclusion of the second webpage element from the audible or tactile output does not alter visual presentation of the first web page within the browser application and does not modify the subsequently loaded DOM of the first web page.

2. The method of claim 1 wherein the subsequently loaded document object model is interpreted under a document object model of the screen reader application and, thereby, the non-visual output of the web page is independent of the browser application deployed by the end user.

3. The method of claim 1 further comprising the step of automatically applying the rule to a second web page responsive to loading a second document object model of the second web page into the screen reader application.

4. The method of claim 1 further comprising the step of setting an application scope of the rule wherein the application scope comprises at least three layers of granularity including page-specific, site-specific and all-sites application of the rule.

5. The method of claim 4 wherein a page-specific first rule overrides a site-specific second rule, and an all-sites third rule is overridden by either the page-specific first rule or the site-specific second rule.

6. The method of claim 1 wherein the web page elements are enumerated in a dialog box and are ordered from most nested to least nested nodes in a tree structure of the document object model.

7. The method of claim 1 wherein the screen reader application excludes the second web page element from a tab order.

8. The method of claim 1 wherein the rule is initially designated temporary and only applied within a first browser tab or window wherein the end user may evaluate how the temporary rule modifies the non-visual output of the first web page before making the rule permanent.

9. The method of claim 1 further comprising the steps of:
presenting a custom XPath expression text input control to the end user;
receiving an XPath expression string from the control;
responsive to an exception in the XPath expression, communicating the exception to the end user;
responsive to a valid XPath expression, prompting the end user to save the XPath expression as a custom rule;
saving the custom rule; and
applying the custom rule to subsequent web pages.

10. The method of claim 9 further comprising the step of counting matching web page elements returned by the XPath expression and communicating an integer count result to the end user prior to saving the XPath expression as the custom rule.

11. A non-transitory computer readable medium having stored thereon computer-executable instructions that, in response to being executed by a computing device, cause the computing device to perform operations comprising:
loading a document object model (DOM) of a first web page following a document object model into a screen reader application, the first web page having a plurality of web page elements including a first web page element and a second web page element;
establishing an end-user navigable virtual cursor, the virtual cursor used for outputting content from the first web page to a non-visual medium selected from the group consisting of text-to-speech and Braille;
receiving an end-user command responsive to the virtual cursor positioned at the second web page element, the end-user command establishing a rule to exclude the second web page element from a non-visual output of the first web page;
saving the rule for excluding the second web page element from the non-visual output of the first web page;
subsequently loading the DOM of the first web page into the screen reader application upon subsequent loading of the first web page into a browser application;
outputting the first web page to the non-visual medium using the subsequently loaded DOM of the first web page using the screen reader application to traverse through the plurality of web elements of the subsequently loaded DOM, wherein the second web page element is excluded from traversal by applying the rule, and wherein each traversed web page element is audibly or tactilely output to the end user; and
wherein exclusion of the second webpage element from the audible or tactile output does not alter visual presentation of the first web page within the browser application and does not modify the subsequently loaded DOM of the first web page.

12. The non-transitory computer-readable medium of claim 11 wherein the subsequently loaded document object model is interpreted under the document object model of the screen reader application and thereby the non-visual output of the web page is independent of the browser application deployed by the end user.

13. The non-transitory computer-readable medium of claim 11 further comprising instructions for automatically applying the rule to a second document object model of a second web page to modify the non-visual output of the second web page through the screen reader application.

14. The non-transitory computer-readable medium of claim 11 wherein the screen reader application broadcasts an audible cue responsive to applying the rule to exclude the second web page element from the non-audible output of the first web page.

15. The non-transitory computer-readable medium of claim 11 further comprising instructions for performing an additional step of setting an application scope of the rule wherein the application scope comprises at least three layers of granularity including page-specific, site-specific and all-sites application of the rule.

16. The non-transitory computer-readable medium of claim 11 wherein a page-specific first rule overrides a site-specific second rule, and an all-sites third rule is overridden by either the page-specific first rule or the site-specific second rule.

17. The non-transitory computer-readable medium of claim 11 wherein the web page elements are enumerated in a dialog box and are ordered from most nested to least nested nodes in a tree structure of the document object model.

18. The non-transitory computer-readable medium of claim 11 wherein the screen reader application excludes the second web page element from a tab order.

19. The non-transitory computer-readable medium of claim 11 wherein the rule is initially designated temporary and only applied within a first browser tab or window wherein the end user may evaluate how the temporary rule modifies the non-visual output of the first web page before making the rule permanent.

20. The non-transitory computer-readable medium of claim 11 further comprising instructions for performing the additional steps of:
presenting a custom XPath expression text input control to the end user;
receiving an XPath expression string from the control;
responsive to an exception in the XPath expression, communicating the exception to the end user;
responsive to a valid XPath expression, prompting the end user to save the XPath expression as a custom rule;
saving the custom rule; and
applying the custom rule to subsequent web pages.

* * * * *